United States Patent
Grizim et al.

(10) Patent No.: US 7,928,890 B2
(45) Date of Patent: Apr. 19, 2011

(54) PHASED ARRAY RADAR ANTENNA HAVING REDUCED SEARCH TIME AND METHOD FOR USE THEREOF

(75) Inventors: Jehezkel Grizim, Givat-Shmuel (IL);
Alexander Lomes, Maccabim (IL);
Yacob Wagman, Rishon Le Zion (IL);
Shmuel Ron, Rishon Le Ziyyon (IL);
Haim Richman, Mazkeret Batya (IL);
Abraham Reich, Rishon Le Zion (IL);
David Rabia, Rishon Le Zion (IL)

(73) Assignee: Elta Systems Ltd., Ashdod (IL)

( * ) Notice: Subject to any disclaimer, the term of this patent is extended or adjusted under 35 U.S.C. 154(b) by 113 days.

(21) Appl. No.: 11/914,090

(22) PCT Filed: May 9, 2005

(86) PCT No.: PCT/IL2005/000489
§ 371 (c)(1),
(2), (4) Date: Nov. 9, 2007

(87) PCT Pub. No.: WO2006/120665
PCT Pub. Date: Nov. 16, 2006

(65) Prior Publication Data
US 2008/0191927 A1    Aug. 14, 2008

(51) Int. Cl.
*G01S 13/00*    (2006.01)
(52) U.S. Cl. ............................................ 342/13; 342/59
(58) Field of Classification Search .................... 342/13, 342/59, 159
See application file for complete search history.

(56) References Cited

U.S. PATENT DOCUMENTS

| | | | |
|---|---|---|---|
| 3,587,054 | A | 6/1971 | Byrne |
| 3,589,054 | A | 6/1971 | Byrne et al. |
| 3,858,206 | A | 12/1974 | Scheidler et al. |
| 3,858,208 | A | 12/1974 | Parke et al. |
| 4,276,551 | A | 6/1981 | Williams et al. |

(Continued)

FOREIGN PATENT DOCUMENTS

EP    0440200 A    8/1991
(Continued)

OTHER PUBLICATIONS

Heed M: "The ERIEYE phased array antenna from a systems viewpoint" Phased Array Systems and Technology, 2000. IEEE International Conference, pp. 391-394.

(Continued)

*Primary Examiner* — John B Sotomayor
(74) *Attorney, Agent, or Firm* — Browdy and Neimark, PLLC

(57) ABSTRACT

A phased array radar antenna includes at least two antennas (11, 12, 13, 14) adapted for simultaneous operation at different non-mutually interfering frequencies. The phased array radar antenna may be fitted to an aircraft having a fuselage supporting first and second radar side antennas (11, 12) on opposite sides thereof, a nose portion supporting a first radar end antenna (13), and a tail portion supporting a second radar end antenna (14). Respective radomes cover the first and second radar end antennas so as to provide a smooth aerodynamic contour, and a radar control unit (15) is disposed within the fuselage and coupled to the first and second radar side antennas and to the first and second radar end antennas for operating the first or second radar side antenna simultaneously with the first or second radar end antenna at respective first and second different frequencies.

21 Claims, 4 Drawing Sheets

U.S. PATENT DOCUMENTS

| | | | |
|---|---|---|---|
| 4,743,907 A | | 5/1988 | Gellekink |
| 4,779,097 A | * | 10/1988 | Morchin ......................... 342/368 |
| 4,870,426 A | * | 9/1989 | Lamberty et al. ............. 343/727 |
| 5,097,267 A | | 3/1992 | Raviv |
| 5,132,693 A | * | 7/1992 | Werp ............................ 342/179 |
| 5,248,982 A | * | 9/1993 | Reinhardt et al. ............. 342/375 |
| 5,276,452 A | * | 1/1994 | Schuss et al. ................. 342/371 |
| 5,414,433 A | * | 5/1995 | Chang ............................ 342/375 |
| 6,043,770 A | | 3/2000 | Garcia et al. |
| 6,208,304 B1 | * | 3/2001 | Strickland ..................... 343/705 |
| 6,714,163 B2 | * | 3/2004 | Navarro et al. ............... 343/705 |
| 7,463,210 B2 | * | 12/2008 | Rawnick et al. .............. 343/795 |
| 2008/0191927 A1 | * | 8/2008 | Grizim et al. ................. 342/59 |
| 2008/0259969 A1 | * | 10/2008 | Piper et al. ......................... 372/3 |
| 2009/0027267 A1 | * | 1/2009 | Carter et al. .................. 342/372 |

FOREIGN PATENT DOCUMENTS

| | | |
|---|---|---|
| EP | 0954056 A1 | 11/1999 |
| EP | 0972316 B | 9/2003 |
| EP | 1012624 B | 2/2004 |
| EP | 1505407 | 7/2007 |
| RU | 2234714 C2 * | 8/2004 |

OTHER PUBLICATIONS

Teti J G Jr et al: "Wideband airborne early warning (AEW) radar" Record of the 1993 IEEE National Radar Conference, pp. 239-244.

Ahlbom S et al.: "A Swedish Airborne Early Warning System Based on the Ericsson ERIEYE Radar" on Ericsson Review, Ericsson, Stockholm, SE, vol. 72, No. 2, Jan. 1995, pp. 54-63.

Grizim, J., "Airbourne Early Warning and Battle Management", Presentation Dec. 6 & 7, 2004, London, GB., date available to public unknown, but assumed before May 9, 2005.

Grizim, J., "Airbourne Early Warning and Battle Management", Audio File containing speech given by J. Grizim, Dec. 6 & 7, 2004, London, GB, date available to public unknown, but assumed before May 9, 2005.

* cited by examiner

PHASED ARRAY RADAR ANTENNA HAVING REDUCED SEARCH TIME AND METHOD FOR USE THEREOF

FIELD OF THE INVENTION

This invention relates to phased array radar antennas, particularly for airborne radar.

BACKGROUND OF THE INVENTION

Phased array antennas are well known in the art provide for wide bandwidth, low power losses, and have the capability of radiating at multiple frequencies in a given beam direction. The use of the invention is thus not intended to be restricted to any particular type of aircraft. Thus regardless of the size or type of aircraft, some kind of radar system is required. Long range radar with 360°-coverage requires a large antenna mounted above the aircraft fuselage, to minimize airframe interference, and requires high power to give the required long-range detection. These two requirements have so far been to a certain extent mutually incompatible since a large antenna mounted above the aircraft fuselage causes substantial drag and coupled with the high power requirements of the long-range radar only a large aircraft could be used.

U.S. Pat. No. 5,097,267 (Raviv) published Mar. 17, 1992, assigned to the present applicant and entitled "Airborne early warning radar system" discloses an airborne early warning radar system comprising an automatically controlled pilotless aircraft, a phased array radar antenna disposed in the pilotless aircraft and apparatus for selectably varying the orientation of the phased array radar antenna relative to the aircraft.

All known AEW (Airborne Early Warning) systems, including AWACS, ERIEYE, CONDOR and WEDGETAIL have been based on the traditional architecture of a single-band radar. AWACS employs a mechanically rotating antenna, while the other systems employ an electronically scanned fixed array antenna of the kind described in above-mentioned U.S. Pat. No. 5,097,267.

In the mechanically rotating system, the time required to achieve a full 360° scan is dependent on the time taken to steer the mechanical antenna through a complete 360° revolution. Although the steering of a phased array radar antenna is electronic, a complete electronic scan is nevertheless required to achieve full 360° coverage. Once the radar has tracked a point in space, the same point will not be "visible" to the radar during the current cycle. This means that the longer it takes for a complete scan, the easier it is for a foe to penetrate the radar, since it has more time to intercept and having done so, the more time will elapse until it becomes visible to the radar during a subsequent scan. Consequently, it is desirable to reduce the time for a complete 360° scan.

U.S. Pat. No. 4,870,426 (Lamberty et. al.) published Sep. 26, 1989 and entitled "Dual band antenna element" discloses a radar antenna element comprising a lower band waveguide and an array of parallel, dual-polarized, higher band waveguides and dipoles mounted within or directly adjacent an aperture of the lower band waveguide. The lower band waveguide and each higher band waveguide have one cross-sectional dimension less than 0.5 wavelength.

U.S. Pat. No. 4,743,907 (Gellekink) published May 10, 1988 and entitled "Radar system operating in two frequency bands" discloses a radar system for low-level target tracking comprises a first and a second radar apparatus, both operating at their own frequency, but employing one and the same tracking antenna.

U.S. Pat. No. 4,276,551 (Williams et. al.) published Jun. 30, 1981 and entitled "Electronically scanned antenna" discloses electronically scanned antennas comprising a plurality of frequency scanned antenna sections each of which have a plurality of radiating elements and a plurality of phase shifters individually coupled to the antenna sections. Such an arrangement uses dual frequency for steering the radar beam but does not employ different scan frequencies.

There is no suggestion in the above references to employ a phased array antenna comprising at least two cyclically selectable antenna couplets each comprising a pair of adjacent antennas adapted for simultaneous operation at different frequencies.

It is an object of the present to provide a more compact phased array radar antenna that permits a complete 360° coverage to be achieved.

SUMMARY OF THE INVENTION

This object is realized in accordance with a broad aspect of the invention by a phased array radar antenna comprising at least two antennas adapted for simultaneous operation at different non-mutually interfering frequencies.

In accordance with a preferred embodiment of the invention, there is provided a phased array radar antenna for a vehicle, said phased array antenna comprising:

first and second radar side antennas adapted for affixing to respective sides of a vehicle;

first and second radar end antennas adapted for affixing to respective ends of the vehicle; and a radar control unit adapted for coupling to the first and second radar side antennas and to the first and second radar end antennas for operating the first or second radar side antenna simultaneously with the first or second radar end antenna at respective first and second different frequencies.

The first and second radar side antennas and the first and second radar end antennas may be adapted to cover 360°. In a typical application, such a phased array radar antenna permits full 360° coverage to be achieved in less time than a phased array radar antenna employing only a single search frequency. However, the phased array radar antenna according to the invention may also be employed to achieve full or less than 360° coverage in the same time as hitherto-proposed phased array radar antenna in a more compact unit.

The invention also comprises a method for radar scanning using at least two phased array antennas fixed to respective surfaces of a vehicle so as to provide coverage in different directions, said method comprising simultaneously operating at least two of said antennas at different non-mutually interfering frequencies.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
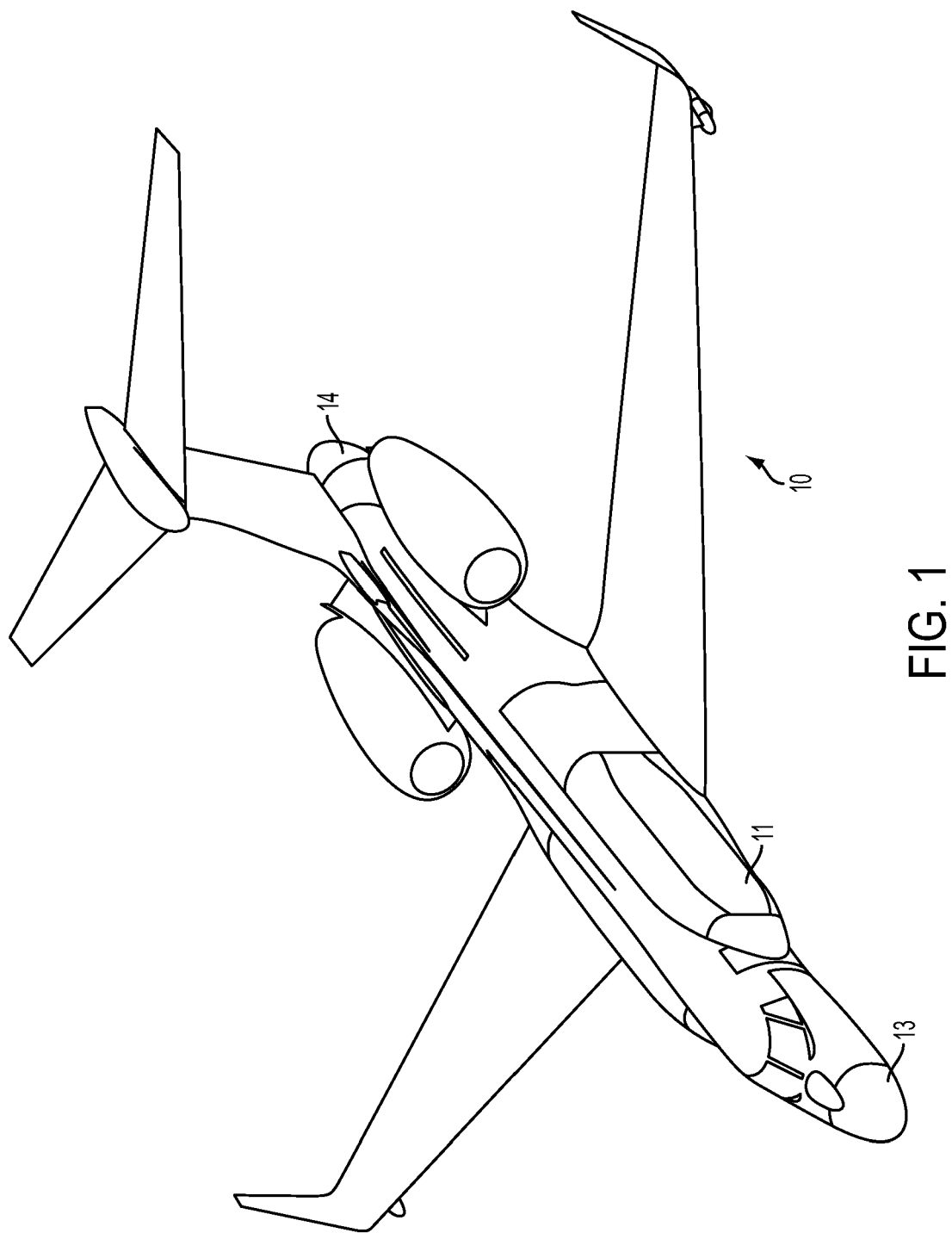
FIG. 1 is a pictorial representation showing an aircraft fitted with a phased array radar antenna according to an exemplary embodiment the invention.

FIG. 1 is a pictorial representation showing an aircraft 10 fitted with phased array radar antennas. A first radar side antenna 11 is adapted for affixing to one side of the aircraft fuselage and a second radar side antenna 12 (shown in FIG. 2) is adapted for affixing to an opposite side of the aircraft fuselage. A first radar end antenna 13 is adapted for affixing to a nose of the aircraft (constituting a front end thereof) and a second radar end antenna 14 is adapted for affixing to a tail of the aircraft (constituting a rear end thereof).

Figure 2:
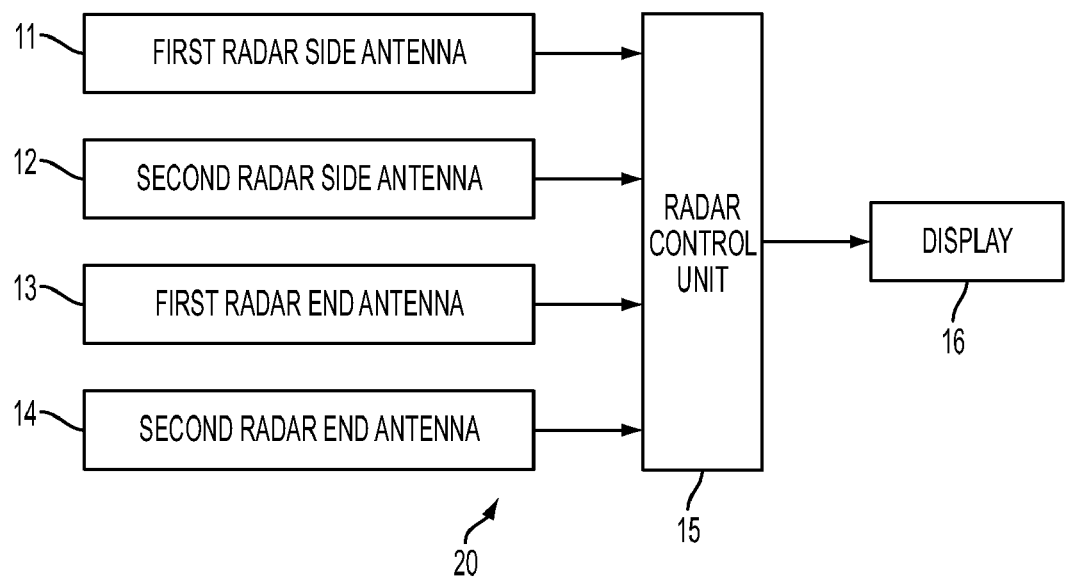
FIG. 2 is a block diagram showing functionally a phased array radar antenna system according to an exemplary embodiment the invention.

FIG. 2 is a block diagram showing functionally a phased array radar antenna system 20 according to an exemplary embodiment the invention. The system 20 includes a radar control unit 15 adapted for coupling to the first and second radar side antennas 11, 12 and to the first and second radar end antennas 13, 14 for operating the first or second radar side antenna simultaneously with the first or second radar end antenna at respective first and second different non-mutually interfering frequencies. The radar control unit 15 is coupled to a display 16 for displaying processed data.

Figure 3:
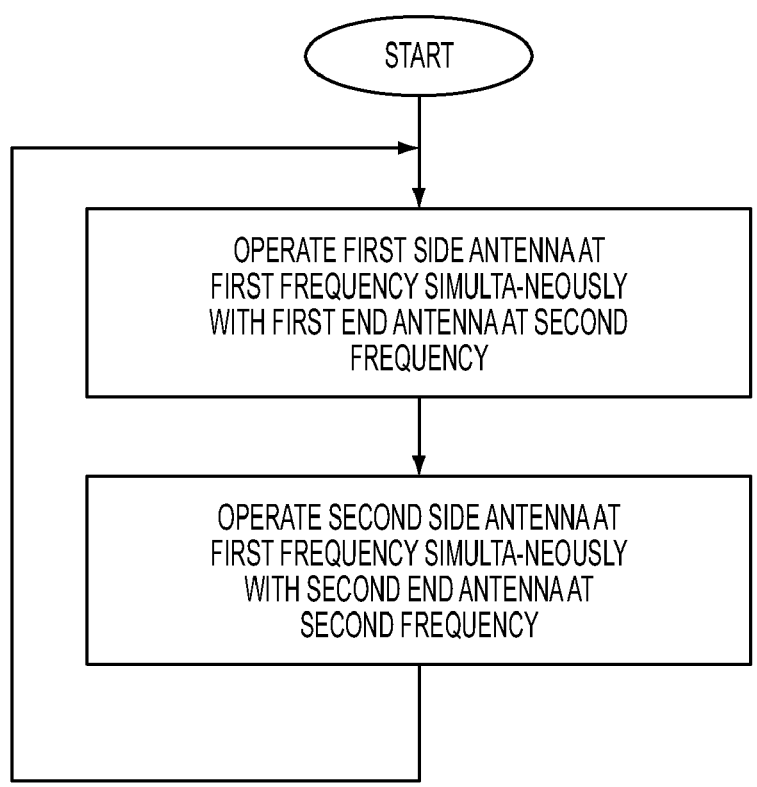
FIG. 3 is a flow diagram showing operation of the phased array radar antenna system shown functionally in FIG. 2.

FIG. 3 is a flow diagram showing operation of the phased array radar antenna system 20 shown in FIG. 2. Thus, full 360° coverage is achieved by operating successive adjacent pairs of antennas at different frequencies. By way of example, during a first area of coverage the radar control unit 15 operates the first side antenna 11 at first frequency simultaneously with the first end antenna 13 at second frequency. This provides coverage of 180° as shown pictorially in FIG. 4. A second area of coverage also spanning 180° is then achieved by operating the second side antenna 12 at the first frequency simultaneously with the second end antenna 14 at the second frequency. Since two antennas are operated simultaneously, the time to achieve a complete 360° scan is approximately half the time required using a single frequency radar system, where each antenna must be operated discretely. By keeping the same scan time, the single frequency radar range performance can be achieved while reducing the antenna dimensions. Since the side antennas 11, 12 have a much greater area than the end antennas 13, 14, the first frequency with which the end antennas operate must be correspondingly higher than the second frequency with which the side antennas operate so as to compensate for the much reduced footprint of the end antennas. In a preferred embodiment, the first frequency is S-band and the second frequency is L-band.

Figure 4:
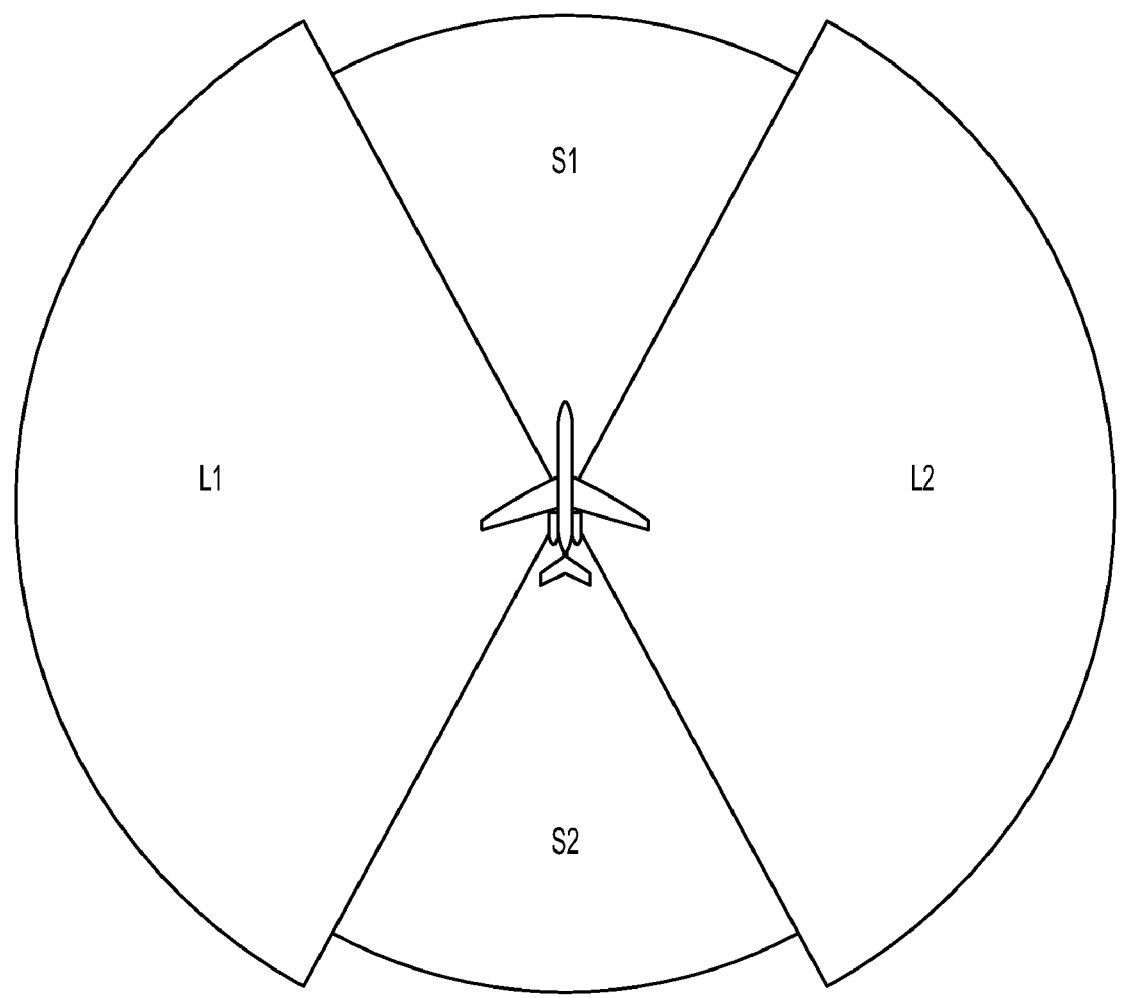
FIGS. 4 to 6 are pictorial representations showing how dual frequency scanning of a phased array radar antenna is implemented according to different embodiments of the invention.

FIG. 4 shows pictorially a practical angular coverage of the antennas when the side antennas 11 and 12 are operated at L-band and the nose and tail antennas 13 and 14 are operated at S-band. It is seen that the angular coverage of the side antennas 11 and 12 is approximately twice that of the nose and tail antennas 13 and 14. By such means, the S-Band radar can reach a sufficient performance relative to the L-Band radar despite of the reduced dimensions.

It should also be noted that the frequencies at which the side antennas 11 and 12, on the one hand, and the nose and tail antennas 13 and 14, on the other hand, are operated must be sufficiently distinctive to prevent mutual interference. In practice, this may require that the frequencies occupy non-overlapping frequency bands although frequencies at opposite extremes of the frequency band may be sufficiently distinct as be mutually non-interfering.

Although the invention has been described with particular regard to an aircraft early warning radar system, it will be understood that the invention is also applicable to other vehicle early warning radar systems and the same principles may be applied to ships, for example, and other vehicles. In saying this, it is nevertheless noted that the particular advantages of the invention over hitherto-proposed early warning radar systems are most manifest in aircraft early warning radar systems owing to the need to provide a radar system that offers a low aerodynamic footprint. In the invention, this is achieved owing to the planar construction of the two side antennas 11 and 12, which lend themselves to being mounted on the fuselage of the aircraft without affecting the aerodynamics of the aircraft. Likewise, the two end antennas 13 and 14, being configured to operate at a higher frequency have a low footprint that allows them to be mounted in suitably shaped radomes at the front and rear ends of the aircraft that is specially designed so as to provide a smooth aerodynamic contour. The mechanical construction of the radomes is within the skill of those versed in the relevant art and is not a feature of the invention. Clearly, such considerations are less important for maritime applications.

Figure 5:
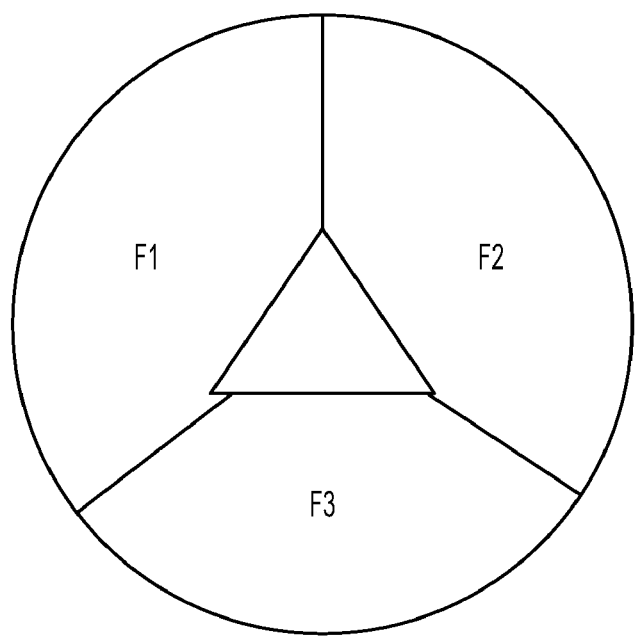

Although a particular embodiment of the invention has been described employing four antennas, it will be appreciated that the principles of the invention may be applied more generally to the use of two or more antennas that are operated simultaneously at different non-mutually interfering frequencies. For example, two antennas may be configured each to provide coverage of non-overlapping 180° sectors, thus allowing both antennas to be operated simultaneously thereby halving the time to achieve full 360° coverage. Likewise, as shown in FIG. 5, three antennas F1, F2 and F3 may be configured each to provide coverage of non-overlapping 120° sectors, thus allowing the antennas to be operated simultaneously at respective non-mutually interfering frequencies thereby reducing the time to achieve full 360° coverage by a factor of 3.

Figure 6:
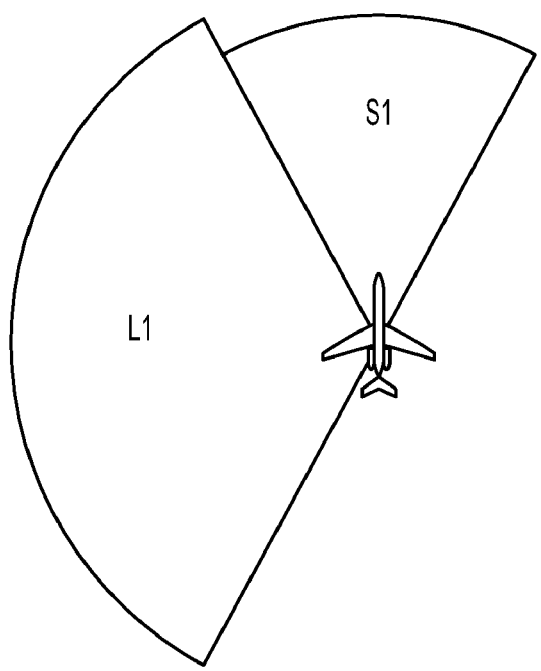

It should also be noted that while the invention has been described with particular regard to full 360° coverage, not always is full 360° coverage required. For example, FIG. 6 shows two antennas L1 and S1 adapted to be operated simultaneously at respective non-mutually interfering frequencies so as to provide in combination partial coverage of 180°. To the extent that such reduced coverage is achieved by operating two or more antennas simultaneously at different non-mutually interfering frequencies, this also is embraced by the present invention.

It will also be understood by those skilled in the art that the invention is equally applicable for both manned and unmanned aircraft.

The invention also contemplates a vehicle, particularly an aircraft that is constructed with the radar system according to the invention.

It will also be understood that the radar system 20 according to the invention may include a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A phased array radar antenna system comprising at least first and second antennas, said at least first and second antennas being configured for simultaneous operation at different respective first and second frequencies; wherein:

the first antenna array is dimensioned for affixing to a nose or tail portion of an aircraft fuselage;

the second antenna array is dimensioned for affixing to a side portion of the aircraft fuselage; and the first frequency is correspondingly higher than the second frequency so as not to interfere with the first frequency and to compensate for the reduced footprint of the first antenna array relative to the second antenna array.

2. The phased array radar antenna system according to claim 1, comprising at least two cyclically selectable antenna array couplets each comprising a pair of adjacent antenna arrays adapted for simultaneous operation at the first or second frequency.

3. The phased array radar antenna system according to claim 1, further comprising a radar control unit for operating the first frequency at S-band and for operating the second frequency at L-band.

4. The phased array radar antenna system according to claim 1, wherein the first antenna array is mounted in a radome having a smooth aerodynamic contour.

5. A phased array radar antenna system comprising at least two antenna arrays, said at least two antenna arrays being configured for simultaneous operation at different respective first and second frequencies; wherein:

the first and second frequencies are sufficiently non-mutually interfering to allow the first and second antenna arrays to scan at least two objects simultaneously in different sectors.

6. The phased array radar antenna system according to claim 5, comprising at least two cyclically selectable antenna array couplets each comprising a pair of adjacent antenna arrays configured for simultaneous operation at the first or second frequency.

7. The phased array radar antenna system according to claim 5 being configured for mounting on a vehicle, said phased array antenna comprising:

first and second radar side antenna arrays configured for affixing to respective sides of a vehicle;

first and second radar end antenna array configured for affixing to respective ends of the vehicle, said ends of the vehicle having a reduced footprint relative to the sides of the vehicle; and a radar control unit configured for coupling to the first and second radar end antenna arrays and to the first and second radar side antenna arrays for operating the first or second radar end antenna array simultaneously with the first or second radar side antenna array at respective first and second different frequencies, the first frequency being correspondingly higher than the second frequency so as not to interfere with the first frequency and to compensate for the much reduced footprint of the first antenna array relative to the second antenna array.

8. The phased array radar antenna system according to claim 7, wherein the radar control unit is configured to operate the first frequency at S-band and the second frequency at L-band.

9. The phased array radar antenna system according to claim 7, wherein the vehicle is an aircraft and the first and second radar side antenna arrays are configured for fixing to a fuselage of the aircraft.

10. The phased array radar antenna system according to claim 9, wherein the aircraft is unmanned.

11. The phased array radar antenna system according to claim 5, wherein the first antenna array is mounted in a radome having a smooth aerodynamic contour.

12. Dual band early warning radar system comprising a phased array radar antenna system that includes at least first and second antenna arrays, said at least first and second antenna arrays being configured for simultaneous operation at different respective first and second frequencies; wherein:

the first antenna array is dimensioned for affixing to a nose or tail portion of an aircraft fuselage;

the second antenna array is dimensioned for affixing to a side portion of the aircraft fuselage; and the first frequency is correspondingly higher than the second frequency so as not to interfere with the first frequency and to compensate for the reduced footprint of the first antenna array relative to the second antenna array.

13. A method for radar scanning using at least two phased array antenna arrays fixed to respective surfaces of a vehicle so as to provide coverage in different directions, said method comprising simultaneously operating at least two of said antenna arrays at different respective first and second frequencies, said method comprising:

dimensioning the first antenna array for affixing to a nose or tail portion of an aircraft fuselage;

dimensioning the second antenna array for affixing to a side portion of the aircraft fuselage; and selecting the first frequency in a frequency band that is correspondingly higher than the second frequency so as not to interfere with the first frequency and to compensate for the reduced footprint of the first antenna array relative to the second antenna array.

14. The method according to claim 13, for use with at least four phased array antenna arrays fixed to respective sides and ends of the aircraft fuselage, the method comprising:

cyclically selecting successive antenna array couplets each comprising a pair of adjacent antenna arrays; and simultaneously operating the adjacent antenna arrays in the selected couplet at the first and second frequencies so that the antenna array affixed to the nose or tail portion of the aircraft is always operated at the first frequency.

15. The method according to claim 13, wherein the first frequency is S-band and the second frequency is L-band.

16. A method for radar scanning using at least two phased array antenna arrays fixed to respective surfaces of a vehicle so as to provide coverage in different directions, said method comprising simultaneously operating at least two of said antenna arrays at different respective first and second frequencies, the method comprising:

selecting the first and second frequencies in sufficiently non-mutually interfering frequency bands to allow the first and second antenna arrays to scan at least two objects simultaneously in different sectors.

17. The method according to claim 16 for use with at least four phased array antenna arrays fixed to respective surfaces of the vehicle, the method comprising:

cyclically selecting successive antenna array couplets each comprising a pair of adjacent antenna arrays; and simultaneously operating the adjacent antenna arrays in the selected couplet at the first or second frequency.

18. A vehicle having mounted thereon a dual band early warning radar system comprising a phased array radar antenna system that includes at least first and second antenna arrays, said at least first and second antenna arrays being configured for simultaneous operation at different respective first and second frequencies; wherein:

the first antenna array is dimensioned for affixing to a fore or aft portion of the vehicle;

the second antenna array is dimensioned for affixing to a side portion of the vehicle; and the first frequency is correspondingly higher than the second frequency so as not to interfere with the first frequency and to compensate for the reduced footprint of the first antenna array relative to the second antenna array.

19. The vehicle according to claim 18, being an aircraft comprising:
a fuselage supporting said first and second radar side antenna arrays on opposite sides thereof,
a nose portion supporting the first radar end antenna array,
a tail portion supporting the second radar end antenna array, and
a radar control unit disposed within the fuselage and coupled to the first and second radar end antenna arrays and to the first and second radar side antenna arrays for operating the first or second radar end antenna array simultaneously with the first or second radar side antenna array at respective first and second different frequencies, the first frequency being correspondingly higher than the second frequency so as not to interfere with the first frequency and to compensate for the reduced footprint of the first antenna array relative to the second antenna array.

20. The aircraft according to claim 19, comprising:
respective radomes covering the first and second radar end antenna arrays so as to provide a smooth aerodynamic contour.

21. The phased array radar antenna system according to claim 7, wherein the vehicle is an aircraft and the first and second radar end antenna arrays are configured for fixing to a nose or tail portion of the aircraft.

* * * * *

UNITED STATES PATENT AND TRADEMARK OFFICE
CERTIFICATE OF CORRECTION

PATENT NO. : 7,928,890 B2  
APPLICATION NO. : 11/914090  
DATED : April 19, 2011  
INVENTOR(S) : Jehezkel Grizim et al.

Page 1 of 1

It is certified that error appears in the above-identified patent and that said Letters Patent is hereby corrected as shown below:

At claim 7, column 5, at line 53, the word "much" should be omitted.

Signed and Sealed this  
Seventh Day of February, 2012

David J. Kappos  
*Director of the United States Patent and Trademark Office*